United States Patent [19]

Galarowic

[11] Patent Number: 5,454,466
[45] Date of Patent: Oct. 3, 1995

[54] ACCUMULATING CONVEYOR

[75] Inventor: Lawrence A. Galarowic, Dearborn, Mich.

[73] Assignee: Visi-Trol Engineering Company, Detroit, Mich.

[21] Appl. No.: 140,591

[22] Filed: Oct. 21, 1993

[51] Int. Cl.⁶ ................................................. B65G 25/00
[52] U.S. Cl. ...................................... 198/751; 198/774.1
[58] Field of Search ................................. 198/751, 774.1

[56] References Cited

U.S. PATENT DOCUMENTS

| | | | |
|---|---|---|---|
| 4,202,440 | 5/1913 | Niki | 198/718 |
| 4,294,347 | 10/1981 | Furlette et al. | 198/774.1 X |
| 4,364,471 | 12/1982 | Furlette et al. | 198/751 |
| 4,441,606 | 4/1984 | Miller et al. | 198/751 |
| 4,658,951 | 4/1987 | Saunders | 198/751 X |
| 4,721,203 | 1/1988 | Kimball et al. | 198/781 |
| 4,781,285 | 11/1988 | Schlatter et al. | 198/774.1 |
| 4,925,005 | 5/1990 | Keller | 198/460 |
| 4,953,687 | 9/1990 | Gazzarrini | 198/347.1 |
| 5,080,220 | 1/1992 | DiFalco | 198/782 |
| 5,145,049 | 9/1992 | McClurkin | 198/374 |

*Primary Examiner*—Cheryl L. Gastineau
*Attorney, Agent, or Firm*—Gifford, Krass, Groh, Sprinkle, Patmore, Anderson & Citkowski

[57] ABSTRACT

Abstract of the Disclosure

An accumulating conveyor of the walking beam type is presented in which a walking shuttle mechanism selectively lifts articles from a stationary portion of a conveyor only when downstream positions of the stationary portion of the conveyor are free to receive them. Sensors at each holding station along the shuttle mechanism are used to detect the absence or presence of an article at each holding station to supply a detection signal to the conveyor controller.

8 Claims, 3 Drawing Sheets

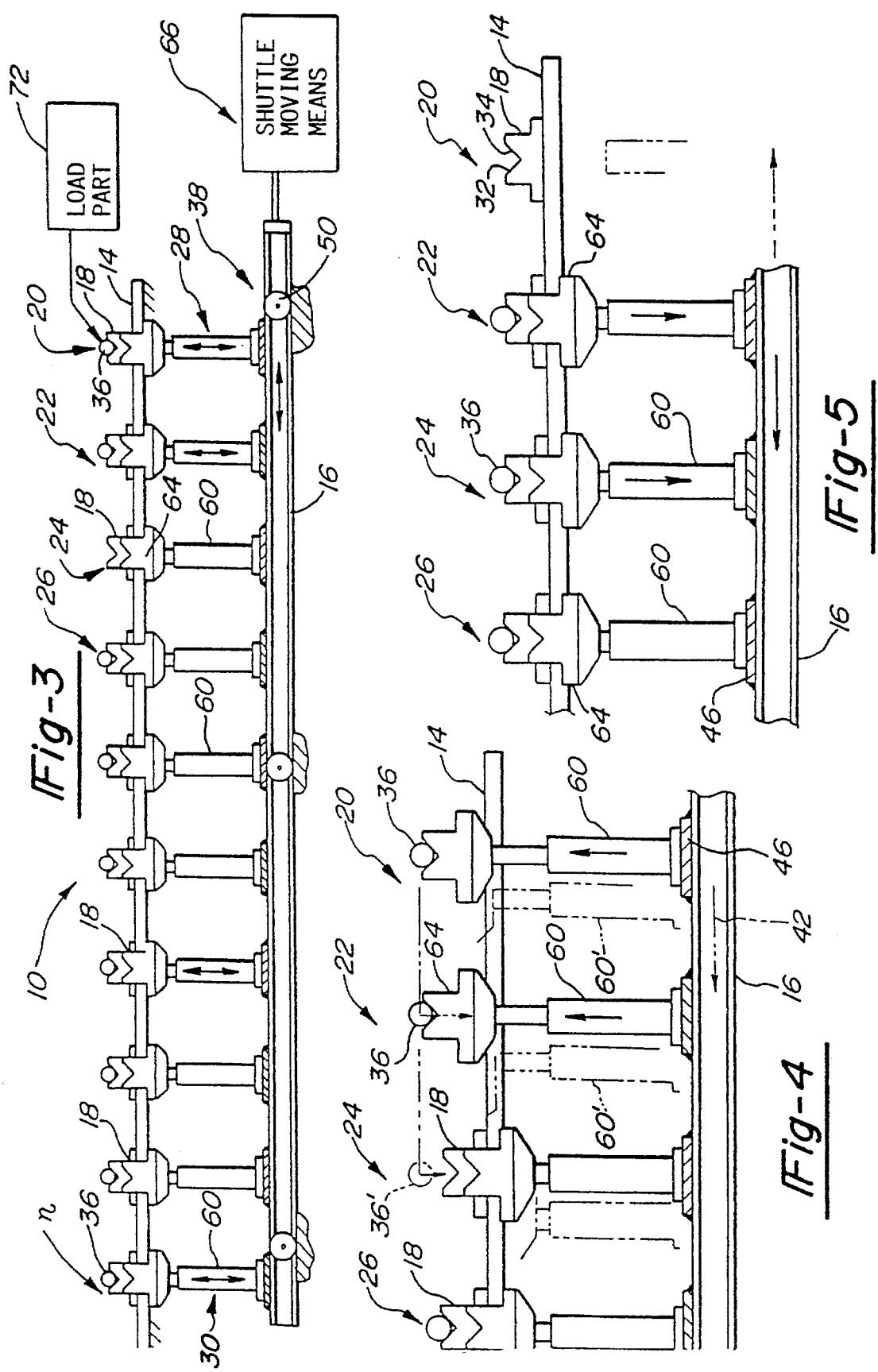

ACCUMULATING CONVEYOR

BACKGROUND OF THE INVENTION

1. Field of the Invention

This invention relates to an accumulating conveyor. More particularly, this invention relates to an accumulating conveyor of the walking beam type.

2. State of the Art

There are various types of accumulating conveyors available. Some existing conveyors utilize a continuous moving conveyor portion which accumulates articles and delays or halts progress of the articles by lifting the articles from the continuous conveyor. Other devices accumulate articles on a stationary conveyor which is selectively operated to advance the articles. Still others use stationary portions to accumulate articles, the articles being engaged for advancement by selectively operated article engaging mechanisms.

In walking beam conveyors, articles are advanced along a stationary beam by a cam operated moving beam which lifts the articles from the stationary beam and horizontally transports all of the articles at one time to be deposited at an advanced position on the beam of the stationary conveyor.

SUMMARY OF THE PRESENT INVENTION

The present invention utilizes a walking beam type mechanism in an accumulating conveyor. Unlike conventional walking beam conveyors which simultaneously pick up and move all of the articles by a moving walking beam to advance them along the stationary beam, the present invention utilizes a walking beam or shuttle mechanism which selectively lifts only certain articles which are to be transported during each forward advancement of the shuttle mechanism.

The accumulating conveyor according to the invention utilizes a shuttle member which extends longitudinally from the inlet to the exit end of the conveyor. Sequential transverse holding stations extend along the shuttle member with article holding fixtures such as V-blocks being located at each station. The shuttle member has longitudinally spaced article engaging means that can be aligned with each holding station. A motor such as a hydraulic cylinder lifts the article engaging mechanisms at selective positions so that they will be transported forwardly as the shuttle mechanism is moved in a forward direction.

Preferably the conveyor of the invention is operated by a control which lifts an article at a given holding station when downstream holding stations are empty and capable of receiving the article. Sensors are located at each holding station to detect the presence or absence of an article located at each station.

BRIEF DESCRIPTION OF THE DRAWING

The advantages of the present invention will be more apparent from the following detailed description when considered in connection with the accompanying drawing wherein:

FIG. 3 is a diagrammatic view showing transfer of articles between the stationary stations of the conveyor and selectively elevated article engaging jaws located on a reciprocating shuttle;

FIG. 4 is a view of the front end of the conveyor schematically shown in FIG. 3 illustrating a subsequent movement of articles from their position in FIG. 3;

FIG. 5 is a view similar to FIG. 4 showing a subsequent movement of articles along the conveyor.

DETAILED DESCRIPTION OF THE PRESENTLY PREFERRED EMBODIMENT OF THE INVENTION

Figure 1:
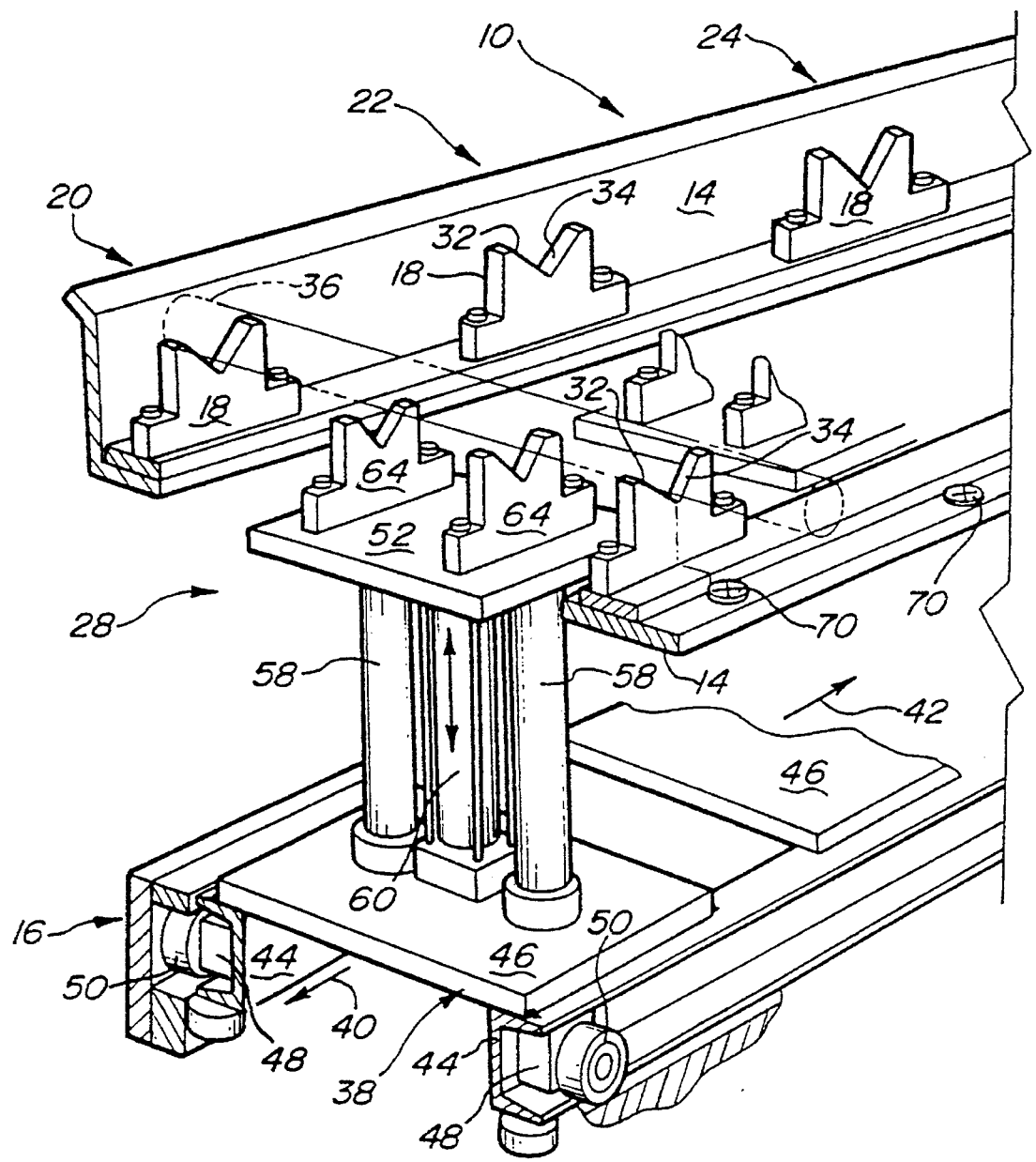
FIG. 1 is a partial perspective view of the accumulating conveyor according to the invention.
Figure 2:
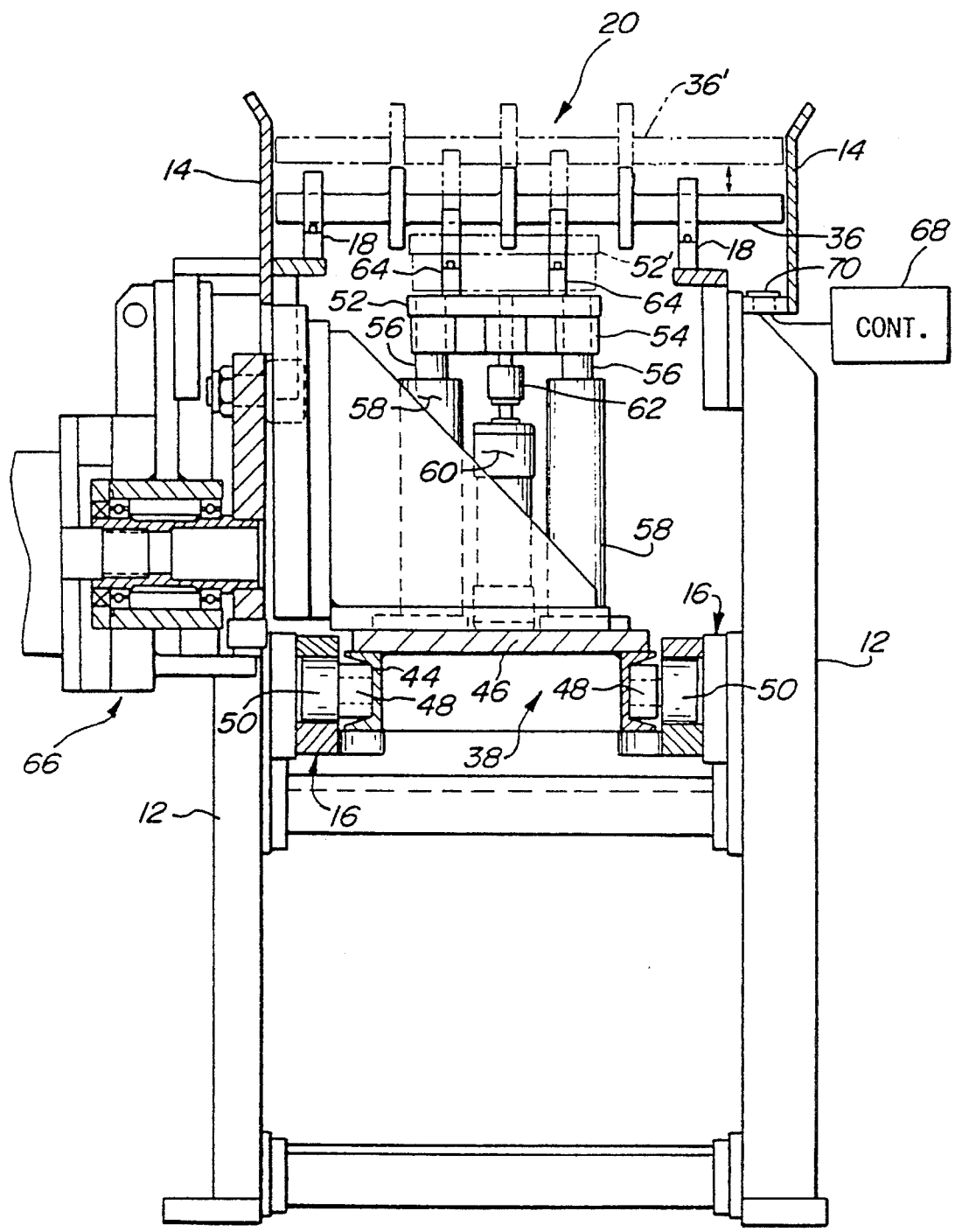
FIG. 2 is an end elevational view of the conveyor shown in FIG. 1.

Referring to FIGS. 1 and 2, the accumulating conveyor 10 according to the invention includes a frame 12 holding a pair of transversely spaced, longitudinally extending support beams 14 and a pair of transversely spaced, longitudinally extending rails 16.

Longitudinally spaced V-blocks 18 are located along each support beam 14, with transversely aligned pairs of the V-blocks defining a series of holding stations 20, 22, 24, 26 through n, see FIG. 3, from the inlet end 28 to the exit end 30 of the conveyor.

Each V-block 18 has a pair of opposed jaws 32 and 34 for holding cam shafts 36 as the articles of work illustrated as being conveyed.

The stationary rails 16 support a shuttle member 38 for reciprocation in opposite longitudinal directions indicated by arrows 40 and 42 in FIG. 1. Shuttle member 38 includes a pair of transversely spaced channels 44 joined at their upper legs by base plates 46. Pillow blocks 48 are attached to the two channels 44 and support longitudinally spaced rollers 50 for rolling contact with the rails 16

Platforms 52 with framework members 54, see FIG. 2, are supported from and above the base plates 46 for vertical reciprocation and are guided and supported by piston rods 56 contained within transversely spaced guide cylinders 58. Motors, in the form of hydraulic cylinders 60, vertically reciprocate the platforms 52 through piston rods 62 contained within the cylinders 60 as the platforms are guided and supported by the cylinder 58.

A pair of transversely spaced V-blocks 64 are mounted on each platform 52 to engage the cam shaft 36 as the platform 52 is vertically lifted from a lower position to an upper position shown in phantom at 52' as seen in FIG. 2. The cam shaft 36 is lifted off the holding V-blocks 18 and is supported completely by the engaging transport V-blocks 64 as shown in phantom at 36' in FIG. 2.

Reciprocation of the shuttle member 38 in a horizontal plane is obtained through a shuttle moving mechanism 66 in a well known manner under the control of a controller 68. Likewise, vertical reciprocation of the V-blocks 64 on platform 52 is obtained by actuation of the hydraulic cylinder 62 under the control of the controller 68.

Sensing units 70 are located along one of the support beams 14 at each holding station 20, 22, 24, etc. to detect the presence or absence of a cam shaft or other work article, with an appropriate detection signal being transmitted to the controller 68.

OPERATION OF THE ACCUMULATING CONVEYOR

The accumulating conveyor 10 of the present invention is of the walking beam type in which the articles 36 being conveyed are advanced from holding station to holding station along a stationary support from the inlet to the exit end of the conveyor. Referring again to FIG. 3, the cam shaft articles or parts 36 are loaded, one at a time, onto the first pair of holding V-blocks 18 by a loader 72 at the inlet end 28 of the conveyor. The parts 36 are advanced along successive holding V-blocks 18 on the stationary support beams 14 at stations 20, 22, 24, 26 etc. until they are advanced off the conveyor from station n at the exit end 30 of the conveyor. In conventional walking beam conveyors, a walking beam portion of the conveyor extends along the length of the conveyor and of the stationary beam and transports all of the parts forwardly above the stationary beam to the next position at which time the beam is lowered to deposit the parts again on the stationary beam.

In a given manufacturing sequence, there may not be a part available for loading at the inlet end 28 by the part loader 72 at a specific time, but there can be a demand for a part to be delivered from the station end at the exit end of the conveyor. Thus, in the operation of the conveyor, there may be stations such as station 24 in FIGS. 3 and 4 in which there is no part. It is, however, desirable to keep advancing the parts toward the exit end of the conveyor to have them available for the next operation.

In the accumulating conveyor of the present invention, the walking beam or shuttle member 38 does not lift all of the parts 36 on the holding V-blocks 18 of the stationary beams 14 in any one moving sequence. In the conveyor of the present invention, parts are raised from the stationary support beams 14 only when the succeeding holding station is empty to enable reception of the part. Referring again to FIG. 4, the lifting cylinder 60 at station 22 will be activated to engage the cam shaft 36 by the work engaging V-block 64 at this station to advance the part in the direction of the arrow 42 as shown by the phantom positions of the cylinders at 60' to carry the part to the position shown at 36' above the holding V-block 18 for deposit at station 24. The presence of a part 36 at station 22 and the absence of a part 36 at station 24 is detected by the sensors 70 along the stationary beam 14, as shown in FIG. 1, which enables the controller 68 to actuate cylinders 60 at station 22 to elevate the part 36 at this station and to lower the part 36 at station 24.

During the next succeeding advancement step, a cylinder 60 at station 20 will elevate the part 36 to transfer to station 22.

Alternatively, the controller 68 can be programmed so that when the sensor 70 at station 24 detects the absence of a part at this station, and the detectors at stations 20 and 22 detect the presence of parts at both of these stations, the cylinders 60 at both of these stations 20 and 22 will lift the parts 36 for simultaneous transfer of the parts from station 22 to station 24 and from station 20 to station 22. The completion of this sequence is shown in FIG. 5. Normally an article 36 will always be transferred from the end station n at the exit end 30 of the conveyor off of the conveyor during each sequence. This will require the actuation of cylinder 60 at station n during each advancement step. It will be apparent that the sensors 70 at all of the various holding stations along the length of the conveyor will sense the presence or absence of an article on the stationary beam to actuate various of the lifting cylinders 60 as required to continue to fill the article void stations.

Having described my invention, additional embodiments will become apparent to those skilled in the art without departing from the scope of the invention as defined in the appended set of claims.

I claim:

1. An accumulating conveyor for advancing an article along said conveyor, comprising:

a shuttle member extending longitudinally from an inlet end to an exit end of said conveyor;

a plurality of transverse holding stations extending along said conveyor between said inlet end and said exit end;

article holding means at each of said holding stations;

a plurality of spaced article engaging means mounted upon a platform atop each said shuttle member for transverse alignment with an article supported upon one of said holding stations;

motor means attached to each of said article engaging means, each said motor means extending between aid platform and a base of said shuttle member for vertically moving said article engaging means from a retracted position to an elevated position, said motor means lifting the article from and to a position above said article holding means;

means for reciprocating said shuttle member so that the article supported upon said shuttle member advances toward said exit end of said conveyor; and control means for actuating said motor means, moving said article engaging means from said retracted position to said elevated position, lifting articles from said holding means and holding said articles in said elevated position while said reciprocating means advances said articles between holding stations toward said exit end of said conveyer and for actuating said motor means for vertically moving said article engaging means from said elevated position to said retracted position to deposit articles from said article engaging means onto said holding means.

2. The conveyor according to claim 1 wherein said control means includes sensors located at said holding stations for detecting the presence of an article on said article holding means which initiates the actuation of said motor means.

3. The conveyor according to claim 2 wherein said sensors detect the absence of an article on said holding means which absence detection together with a presence detection of an article at a station upstream of said absence detection initiates actuation of said motor means at said upstream station.

4. The conveyor according to claim 3 wherein the upstream absence station is immediately adjacent to said presence detection station.

5. The conveyor according to claim 1 wherein said article holding means includes a pair of transversely spaced jaws at each station.

6. The conveyor according to claim 5 wherein said jaws include V-blocks located on a pair of transversely spaced longitudinally extending rails.

7. The conveyor according to claim 1 wherein each of said article engaging means includes a pair of transversely spaced V-blocks mounted on a platform.

8. The conveyor according to claim 7 wherein said motor means each includes a fluid operated cylinder mounted on said shuttle member and attached to said platform.

* * * * *